(12) United States Patent
Williamson et al.

(10) Patent No.: US 7,080,881 B2
(45) Date of Patent: Jul. 25, 2006

(54) FLEXIBLE SEAT FRAME

(75) Inventors: John Williamson, Davie, FL (US);
Pawan Gaikwad, Miami, FL (US)

(73) Assignee: B/E Aerospace, Inc., Wellington, FL (US)

( * ) Notice: Subject to any disclaimer, the term of this patent is extended or adjusted under 35 U.S.C. 154(b) by 14 days.

(21) Appl. No.: 10/943,272

(22) Filed: Sep. 17, 2004

(65) Prior Publication Data

US 2006/0061193 A1    Mar. 23, 2006

(51) Int. Cl.
*B60N 2/42* (2006.01)

(52) U.S. Cl. .............................. 297/216.2; 297/452.18

(58) Field of Classification Search ............. 297/216.2, 297/216.19, 216.1, 216.16, 452.18; 244/122 R; 296/68.1, 65.02
See application file for complete search history.

(56) References Cited

U.S. PATENT DOCUMENTS

| | | | |
|---|---|---|---|
| 2,933,127 A * | 4/1960 | Brewster | ................. 297/216.2 |
| 5,224,755 A | 7/1993 | Beroth | |
| 5,282,665 A | 2/1994 | Beroth | |
| 5,338,090 A * | 8/1994 | Simpson et al. | ......... 297/216.2 |
| 5,344,210 A * | 9/1994 | Marwan et al. | .......... 297/216.2 |
| 5,624,160 A | 4/1997 | Koch et al. | |
| 5,921,629 A | 7/1999 | Koch et al. | |
| 6,412,864 B1 | 7/2002 | Larson | |

OTHER PUBLICATIONS

Meneses et al., U.S. Appl. No. 10/943,672, filed Sep. 17, 2004.
Williamson et al., U.S. Appl. No. 10/944,134, filed Sep. 17, 2004.
Williamson et al., U.S. Appl. No. 10/944,487, filed Sep. 17, 2004.
Williamson et al., U.S. Appl. No. 10/944,488, filed Sep. 17, 2004.

* cited by examiner

*Primary Examiner*—Milton Nelson, Jr.
(74) *Attorney, Agent, or Firm*—Gardner Carton & Douglas LLP

(57) ABSTRACT

A support frame for a seat, in particular an aircraft seat, where the support frame includes a seat support member having an upper surface and a lower surface, a plurality of leg members that each have a first end and a second end, with the first end attached to the lower surface of the seat support member. An angled flexible leg brace capable of stretching to absorb a dynamic load on the frame extends between at least two of the plurality of leg members.

30 Claims, 4 Drawing Sheets

FLEXIBLE SEAT FRAME

CROSS-REFERENCE TO RELATED PATENT APPLICATIONS

Related subject matter is disclosed in copending U.S. patent application Ser. No. 10/944,134, filed Sep. 17, 2004, entitled A CURVED PROFILE TRACKING PLATFORM FOR A PASSENGER SEAT; U.S. patent application Ser. No. 10/944,488, filed Sep. 17, 2004, entitled INDEPENDENT DIVAN DOOR AND DRAWER ASSEMBLY; U.S. patent application Ser. No. 10/944,487, filed Sep. 17, 2004, entitled ATTACHMENT ASSEMBLY FOR MOUNTING A SEAT TO THE FLOOR OF A VEHICLE; and U.S. patent application Ser. No. 10/943,672, filed Sep. 17, 2004, entitled ADJUSTABLE SEAT BELT GUIDE ASSEMBLY.

FIELD OF THE INVENTION

This invention pertains to a seat frame, and, more particularly, to an aircraft passenger seat frame.

BACKGROUND OF THE INVENTION

In order for aircraft seating to be certified for use in an aircraft, the seat must pass a series of performance tests to ensure that it will withstand the various dynamic forces that it may be subjected to, particularly in an emergency situation. In order to be certified as airworthy, aircraft seating designs must pass a series of dynamic tests that simulate aircraft deformation and impulse during emergency conditions. The airworthiness standards for seat structures are described in Federal Aviation Regulation § 25.562, the contents of which is incorporated herein.

Because of the standards set forth in FAR § 25.562, aircraft seating must be strong enough to not only support the weight of the seat occupant, but also to withstand the various load forces that are generated as a result of aircraft maneuvers performed by the pilot during flight, upon landing or, more importantly, in the event of an emergency. These various load forces are known as "g-forces" and result from the forces of acceleration that push or pull on the seat and its occupant when the pilot changes the motion of the aircraft.

G-forces can be positive or negative and can result from either an acceleration or deceleration of the aircraft. Most individuals involved in aviation are familiar with the positive g-forces that result from an aircraft being pulled through a tight radius of turn. In such a turn, the force of the acceleration is increased as greater lift is required to maintain level flight in the turn. This acceleration is a function of the velocity of the aircraft and the radius of the turn and is determined by the equation:

$$a = v^2/r$$

where a is the acceleration force, v is the velocity of the aircraft and r is the radius of the turn. This acceleration force a is then divided by g (32 ft/s$^2$) to determine the number of g's resulting from the turn. The number of g's is the multiplier used to determine the weight of an object as a result of the increased acceleration. For example, under a load of 4 g's, an object weighing 10 pounds will feel as though it weighed 40 pounds.

In addition to acceleration loads encountered in flight, g-loads are also experienced during periods of rapid acceleration or deceleration such as occurs during the takeoff and landing phase of a flight. These g-forces which act laterally to the aircraft and its occupants exert a rearward force with respect to the aircraft during periods of acceleration, thereby forcing one back into the seat on takeoff, and a forward force during the period of deceleration on landing, thereby pulling one forward in the seat.

During a normal take-off and landing evolution, a passenger absorbs this g-loading by either pressing back in the seat or leaning forward. In the event of an emergency or crash landing, however, the seat frame itself must be capable of absorbing high g-loads without being deformed or, even worse, snapped out of the floor of the aircraft. This is particularly true of a sideways facing seat such as a divan used in general aviation and business jet type aircraft.

Conventional seats may use a support member extending diagonally between the legs of the seat to brace and strengthen the seat legs. This type of brace does not optimize energy management within the seat, particularly in the case of a divan seat. This is because the straight diagonal brace acts as a static support offering little, if any, dynamic support. For these reasons, a seat frame that was able to provide dynamic support when absorbing high g-forces generated as a result of rapid deceleration encountered in an emergency landing would be an important improvement in the art.

BRIEF SUMMARY OF THE INVENTION

The invention is directed to a support frame for a seat. The support frame is comprised of a seat support member having an upper surface and a lower surface. A plurality of leg members, each having a first end and a second end, are attached at the first end to the lower surface of the seat support member. A flexible leg brace also extends between at least two of the plurality of leg members.

DETAILED DESCRIPTION OF THE INVENTION

Figure 1:
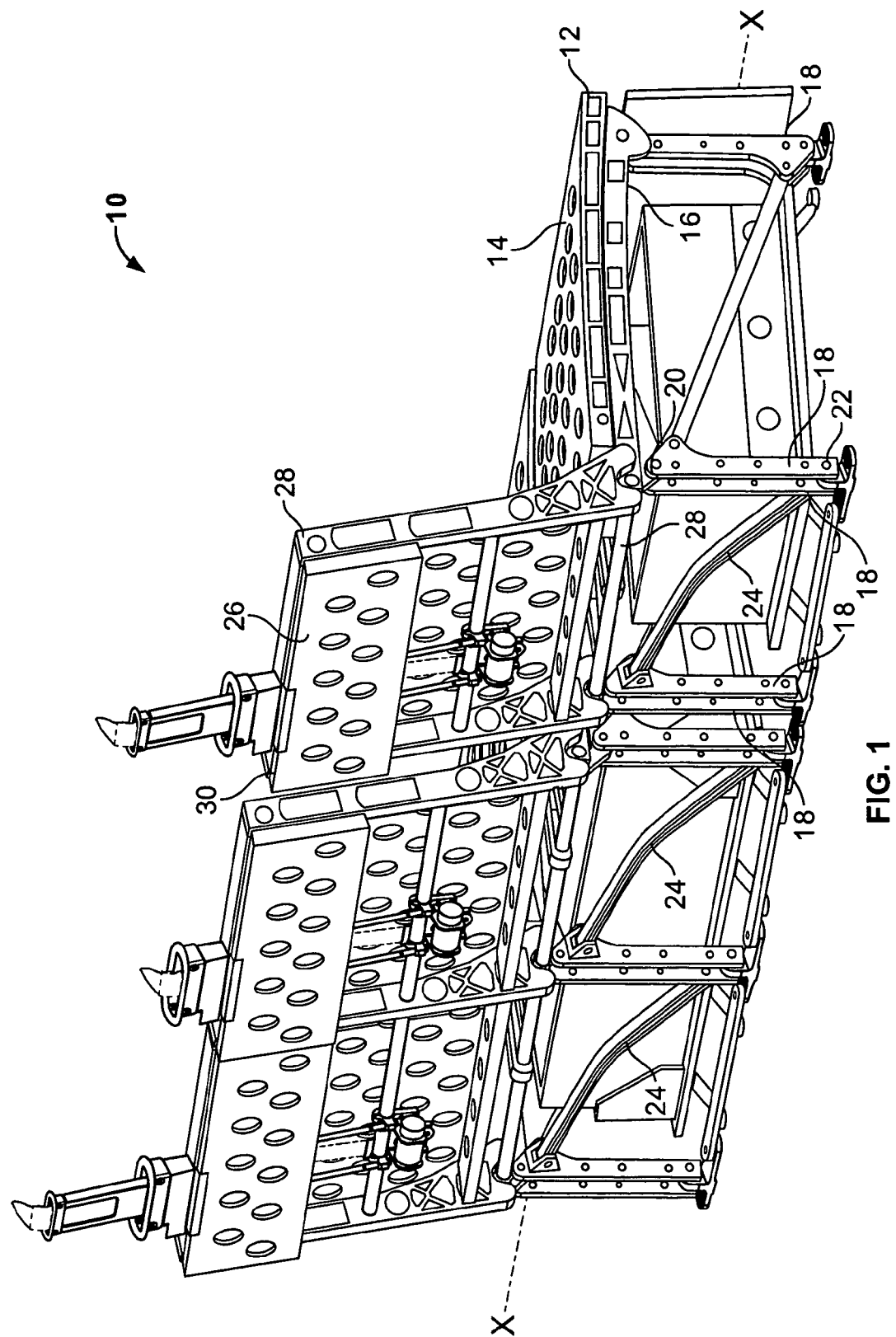
FIG. 1 is a perspective view of a divan seat support frame showing the flexible leg brace.

As a preview to understanding the invention, it is useful to review some of the forces acting on an aircraft during takeoff and landing. During the takeoff roll, various forces act on the aircraft. These forces included the thrust (T) which is produced by the aircraft's power plant. In addition to thrust, lift (L) and drag (D) are produced as soon as the airplane has speed depending on the angle of attack and dynamic pressure. Rolling friction (F) results when there is a normal force on the wheels and is the product of the normal force and the coefficient of the rolling friction. The normal force pressing the wheels against the runway surface is the net of weight and lift while the rolling friction coefficient is a function of the tire type and runway surface texture.

The acceleration of the airplane at any instant during takeoff roll is a function of the net accelerating force and the airplane mass. Thus, from Newton's second law of motion:

$$a=F_n/M$$

or $$a=g(F_n/W)$$

where: a=acceleration (ft/sec$^2$)
$F_n$=net accelerating force (lbs)
W=weight (lbs)
g=gravitational acceleration (32.17 ft/sec$^2$)
M=mass (slugs i.e., W/g)

The net accelerating force on an airplane ($F_n$) is the net of thrust (T), drag (D), and rolling friction (F). Therefore, the acceleration at any instant during takeoff roll is:

$$a=(g/W)(T-D-F)$$

For the case of uniformly accelerated motion—a case which compares closely with the performance of a jet airplane—distance along the takeoff roll is proportional to the square of the Velocity (V$^2$) hence velocity squared and distance can be used almost synonymously. Thus, lift and drag will vary linearly with dynamic pressure (q) or V$^2$ from the point of beginning takeoff roll. As the rolling friction coefficient is essentially unaffected by velocity, the rolling friction will vary as the normal force on the wheels. At zero velocity, the normal force on the wheels is equal to the airplane weight, however, at takeoff velocity, the lift is equal to the weight and the normal force is zero. Therefore, rolling friction decreases linearly with q or V$^2$ from the beginning of takeoff roll and reaches zero at the point of takeoff.

As a result, the total retarding force on the aircraft is the sum of drag and rolling friction (D+F) and, for the majority of aircraft configurations; this sum is nearly constant or changes only slightly during the takeoff roll. Therefore, the net accelerating force is then the difference between the power plant thrust and the total retarding force:

$$F_n=T-D-F$$

The acceleration of an aircraft during the landing roll is negative (deceleration). At any instant during the landing roll, the acceleration is a function of the net retarding force and the airplane mass or as stated from Newton's second law of motion:

$$a=F_r/M$$

or $$a=g(F_r/W)$$

where: a=negative acceleration (ft/sec$^2$)
$F_r$=net retarding force (lbs.)
g=gravitational acceleration (ft/sec$^2$)
W=weight (lbs.)
M=mass (slugs i.e., W/g)

The net retarding force on the airplane ($F_r$) is the net of drag (D), braking friction (F), and thrust (T). Thus, negative acceleration at any time during the landing roll is:

$$a=(g/W)(D+F-T)$$

In the event of an emergency or crash landing, the drag and friction factors can be very high as no wheels may be in contact with the landing surface. This greatly increases the amount of negative acceleration resulting in a very large increase in g-forces that must be absorbed by the aircraft and everything within it.

The invention as shown in FIGS. 1–6B is directed to a support frame 10 for a seat, in particular an aircraft seat that is capable of absorbing the dynamic loads that may be exerted on the aircraft (not shown) as a result of an emergency stop. The support frame 10 is comprised of a seat support member 12 that has an upper surface 14 and a lower surface 16. A plurality of leg members 18, each having a first end 20 and a second end 22, are attached at the first end 20 to the lower surface 16 of the seat support member 12. A flexible leg brace 24 also extends between at least two of the plurality of leg members 18.

In one embodiment, as shown in FIGS. 1, 5 (A–B), 6(A–B), two seat are joined together to form a divan. Each seat has a back member 26 is attached to an end 28 of the seat support member 12. This back member 26 has a first side 28 and a second side 30. A first leg member 32 of the plurality of leg members 18 may be aligned with the first side 28 of the back member 26 while a second leg member 34 is aligned with the second side 30 of the back member 26. The flexible leg brace 24 extends between the first and the second leg members 32, 34.

In one example of the invention, the distance between the first and second leg members 32, 34 is approximately 25 inches. In this example, the flexible leg brace 24 is approximately 23 inches long and may be manufactured of a number of suitable materials including, but not limited to, steel, aluminum, and titanium. Examples of the type of steel that may used include 7075-T6 (QQA-250/12), 2024-T3 (QQA-250/4), and 6067-T6 (QQA-250/11). The tensile strengths of these various steels are approximately 7.075–83,000 PSI, 6,061–45,000 PSI, 2024–70,000 PSI, respectively.

Figure 2:
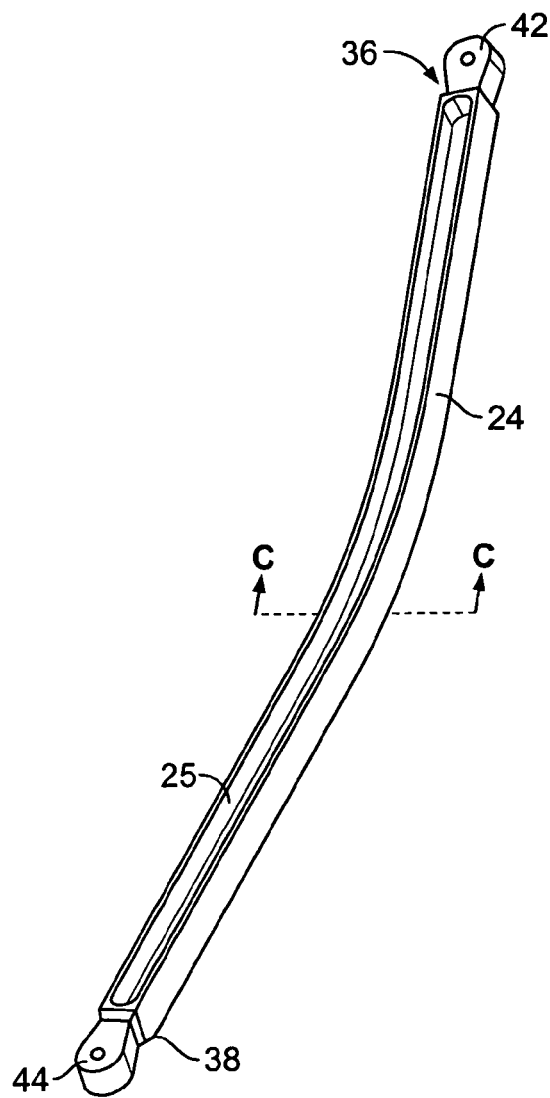
FIG. 2 is a perspective view of the flexible leg brace.
Figure 3A:
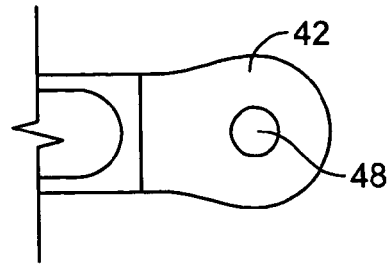
FIG. 3A is top view of a connection point of the flexible leg brace.
Figure 3B:
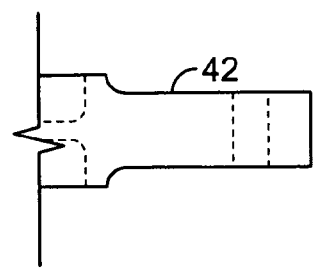
FIG. 3B is a side view of a connection point of the flexible leg brace.
Figure 4:
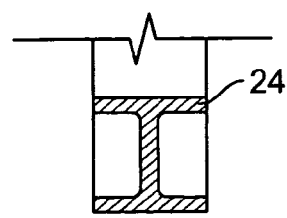
FIG. 4 is a sectional view of the flexible leg brace taken along line C—C of FIG. 2.

As shown in FIG. 2, the flexible leg brace 24 has a first end 36 and a second end 38 with the second end 38 being angled or curved with respect to the first end 36. A channel 25 may be located in one side of the leg brace 24 and may extend along the length of the brace 24 from substantially the first end 36 to substantially the second end 38.

Figure 5A:
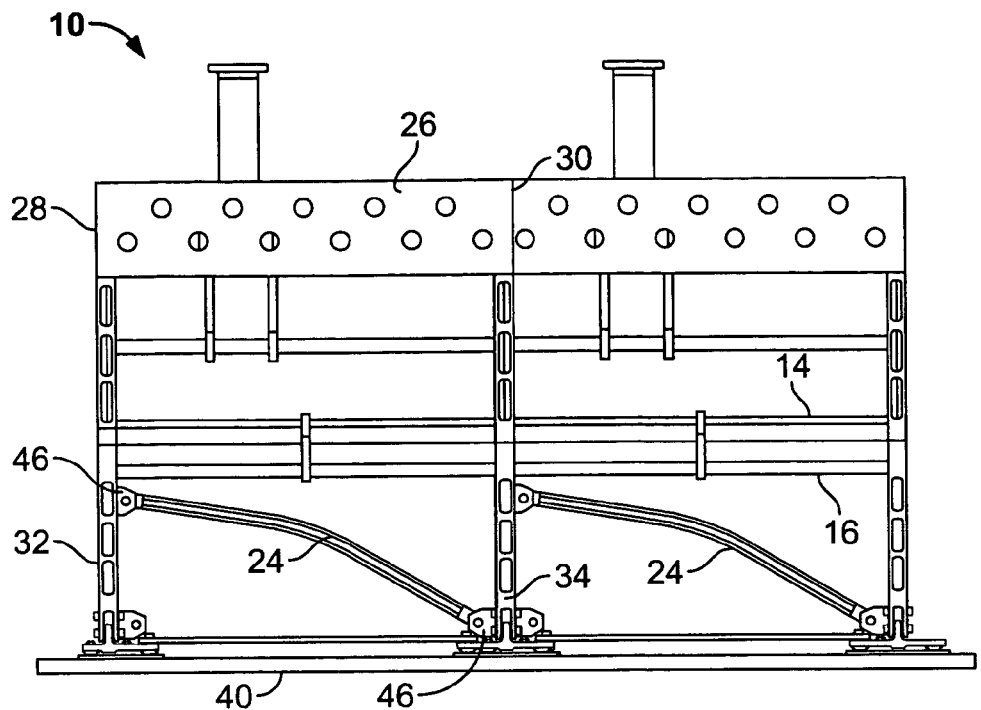
FIG. 5A is a rear view of the seat support frame showing the seat in a normal unloaded condition and the flexible leg brace.
Figure 6A:
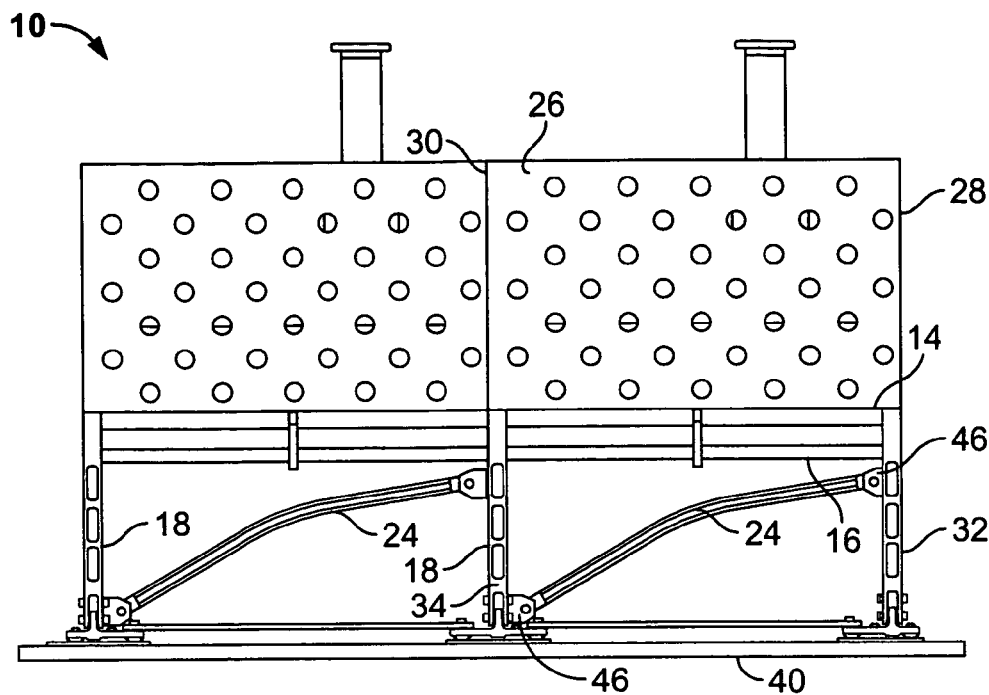
FIG. 6A is a front view of the seat support frame showing the seat in a normal unloaded condition and the flexible leg brace.

Although preferably the flexible leg brace 24 is angled no more than approximately 160°, a leg brace 24 having an angle between approximately 135° to approximately 179° may still function properly and therefore not depart from the spirit and scope of the invention. A connection point 42, 44 is located at each end of the leg brace 36, 38. This connection point may be a curved fitting such as a clevis joint shown in FIGS. 2 and 3 (A–B). An opening 48 may be included in each of the connection points 42, 44 to facilitate connection of the points 42, 44 with a mounting bracket 46 on the support frame 10. The curvature of the connection points 42, 44 allows the joints a slight degree of rotation with respect to the mounting bracket 46, as shown in FIGS. 5A and 6A, during a 16g event. In the example cited above, the horizontal dimension of the leg brace 24 from the center of the opening 48 the first end connection point 42 to the center of the opening 48 on the second connection point 44 is approximately 23 inches. In other words, the flexible leg brace 24 must be slightly longer than a conventional straight brace in order for the flexible brace 24 to fit properly and act in conjunction with the divan support frame 10.

Instead of being angled, the flexible leg brace 24 may be curved from the first end 36 to the second end 38. This curve in the leg brace 24 has a radius at the fillet of approximately 14.5 inches.

Figure 5B:
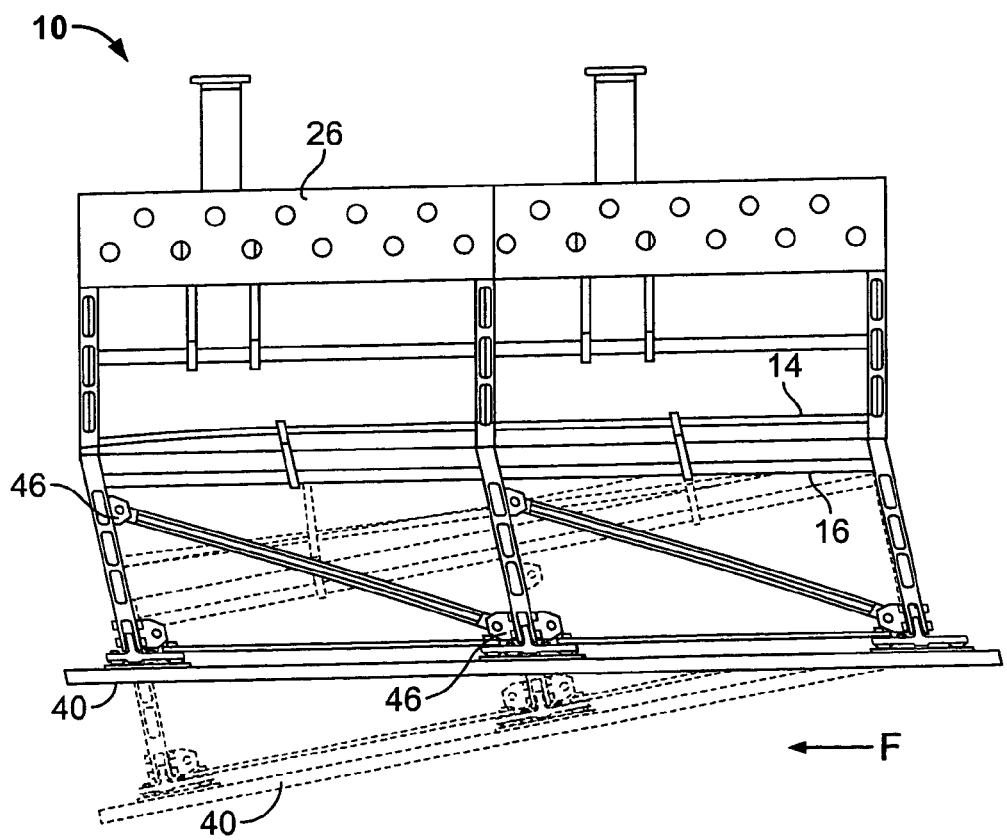
FIG. 5B is a schematic rear view of the seat support frame showing the flexible leg brace extending to absorb a dynamic load.
Figure 6B:
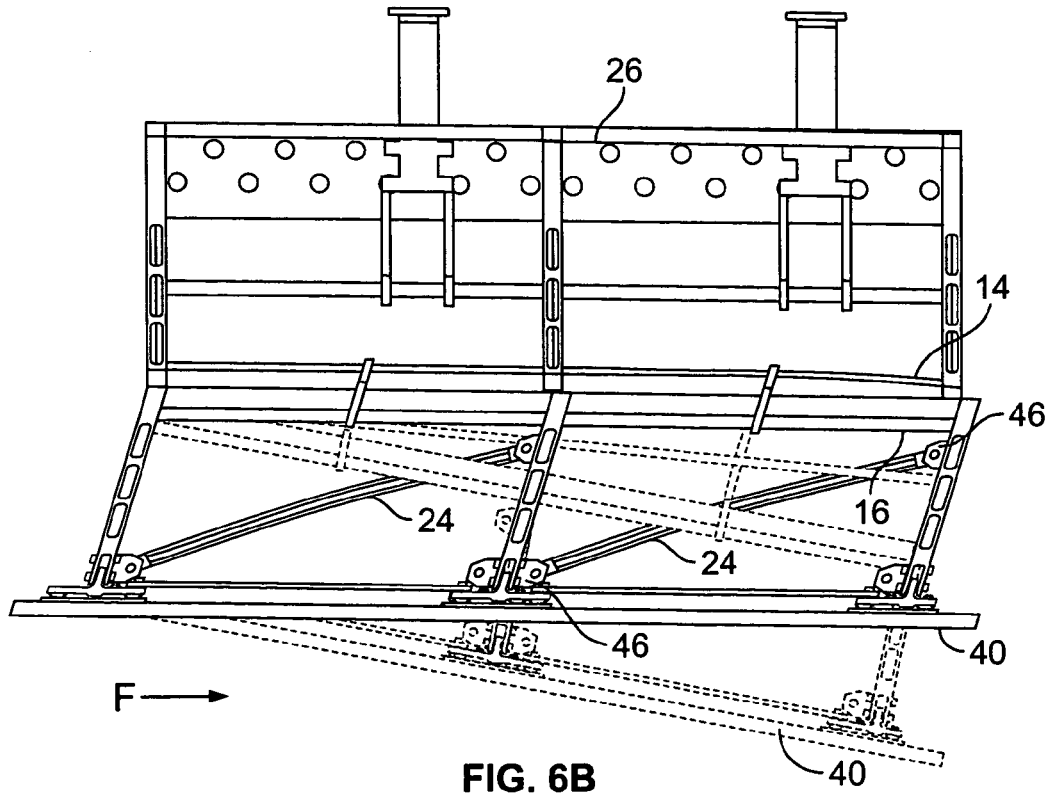
FIG. 6B is a schematic front view of the seat support frame showing the flexible leg brace extending to absorb a dynamic load.

FIGS. 5B and 6B show the flexible leg brace 24 is capable of elastomeric deformation when experiencing dynamic loads in excess of 16 times the force of gravity. When in operation, the flexible leg brace 24 is oriented substantially transverse to the roll axis x—x of the aircraft, as shown in FIG. 1. As shown in FIGS. 5B and 6B, when the aircraft experiences a dynamic load in the direction of F, the support frame 10 begins to deform in the direction of the force F. This deformation—which may result from the support braces 40 in the floor of the aircraft being deformed in the pitch axis—causes the flexible leg brace 24 to extend, thereby absorbing the dynamic load generated by force F. This extension of the flexible leg brace 24 allows the support frame 10 to remain attached to the floor of the aircraft while absorbing the load.

Because the flexible leg brace 24 does not contract once it has been extended, a dynamic load sufficient to cause deformation of the flexible leg brace 24 would most likely result in strike damage to the airframe in which the seat support frame 10 is located. As a result, the seat support frame would be unusable in the future. The flexible nature of the leg brace 24, however, will allow for the seat support frame 10 to remain mounted to the floor of the aircraft throughout the dynamic evolution.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A support frame for a seat, the support frame comprised of:
   a seat support member having an upper surface and a lower surface;
   a plurality of leg members attached to the seat support member;
   a back member attached to an end of the seat support member, the back member having a first side and a second side;
   a first leg member of the plurality of leg members aligned with the first side of the back member;
   a second leg member of the plurality of leg members aligned with the second side of the back member; and
   a flexible leg brace extending between the first and the second leg members.

2. The support frame of claim 1, wherein the seat is an aircraft seat.

3. The support frame of claim 1, wherein each leg of the plurality of leg members has a first end and a second end, and the first end is attached to the lower surface of the seat support member.

4. The support frame of claim 1, wherein the flexible leg brace is manufactured of a material from the group consisting of steel, aluminum, or titanium.

5. The support frame of claim 1, wherein the flexible leg brace is capable of elastomeric deformation when experiencing dynamic loads in excess of 16 times the force of gravity.

6. The support frame of claim 1, wherein:
   the flexible leg brace has a first end and a second end; and
   the flexible leg brace is angled from the first end to the second end.

7. The support frame of claim 6, wherein the angle between the first end and the second end of the leg brace is no greater than approximately 179°.

8. The support frame of claim 6, wherein:
   the leg brace has a plurality sides; and
   at least one side defines a channel extending from substantially the first end to substantially the second end.

9. The support frame of claim 6, wherein the flexible leg brace is curved from the first end to the second end.

10. The support frame of claim 9, wherein:
    the curve in the leg brace has a radius of curvature; and
    the radius of curvature is no greater than approximately 18 inches.

11. The support frame of claim 6, wherein each of the first and second ends terminates in a connection point.

12. The support frame of claim 11, wherein the connection points have a curved outer edge.

13. The support frame of claim 11, wherein each of the connection points define an opening therethrough.

14. A support frame for a seat, the support frame comprised of:
    a seat support member having an upper surface and a lower surface;
    a plurality of leg members attached to the seat support member; and
    a flexible leg brace angled between a first end and a second end and extending between at least two of the plurality of leg members wherein the angle is a curvature from the first end to the second end.

15. The support frame of claim 14, wherein:
    the curve in the leg brace has a radius of curvature; and
    the radius of curvature is no greater than approximately 18 inches.

16. A support frame for a seat, the support frame comprised of:
    a seat support member having an upper surface and a lower surface;
    a plurality of leg members attached to the seat support member; and
    a flexible leg brace extending between at least two of the plurality of leg members, the flexible leg brace being angled from a first end to a second end and having a plurality of sides where at least one side defines a channel extending from substantially the first end to substantially the second end.

17. A support frame for a seat, the support frame comprised of:
   a seat support member having an upper surface and a lower surface;
   a plurality of leg members each attached to the seat support member; and
   a flexible leg brace, capable of elastomeric deformation when experiencing dynamic loads in excess of 16 times the force of gravity, extending between at least two of the plurality of leg members.

18. The support frame of claim 17, wherein the seat is an aircraft seat.

19. The support frame of claim 17, wherein a back member is attached to an end of the seat support member.

20. The support frame of claim 19, wherein:
   the back member has a first side and a second side;
   a first leg member of the plurality of leg members is aligned with the first side of the back member;
   a second leg member of the plurality of leg members is aligned with the second side of the back member; and
   the flexible leg brace extends between the first and the second leg members.

21. The support frame of claim 17, wherein the flexible leg brace is manufactured of a material from the group consisting of steel, aluminum, or titanium.

22. The support frame of claim 17, wherein:
   the flexible leg brace has a first end and a second end; and
   the flexible leg brace is angled from the first end to the second end.

23. The support frame of claim 22, wherein:
   the leg brace has a plurality sides; and
   at least one side defines a channel extending from substantially the first end to substantially the second end.

24. The support frame of claim 22, wherein the angle between the first end and the second end of the leg brace is no greater than approximately 179°.

25. The support frame of claim 22, wherein the flexible leg brace is curved from the first end to the second end.

26. The support frame of claim 25, wherein:
   the curve in the leg brace has a radius of curvature; and
   the radius of curvature is no greater than approximately 18 inches.

27. The support frame of claim 17, wherein each of the first and second ends terminates in a connection point.

28. The support frame of claim 27, wherein each of the connection points define an opening therethrough.

29. The support frame of claim 27, wherein the connection points have a curved outer edge.

30. A support frame for a seat, the support frame comprised of:
   a seat support member having an upper surface and a lower surface;
   a plurality of leg members attached to the seat support member; and
   a flexible leg brace extending between at least two of the plurality of leg members, the flexible leg brace being angled no greater than approximately 179° between a first end and a second end.

* * * * *